United States Patent [19]

Lindley et al.

[11] Patent Number: 5,965,664
[45] Date of Patent: Oct. 12, 1999

[54] HIGH CONCENTRATION SILANE EMULSIONS FOR RENDERING ABSORBENT SUBSTRATES WATER REPELLENT

[75] Inventors: William Clarke Lindley; James Thomas Lindley, Jr., both of Burlington; Herman Gustav Weiland, Greensboro, all of N.C.

[73] Assignee: Lindley Laboratories, Inc., Gibsonville, N.C.

[21] Appl. No.: 08/921,624

[22] Filed: Aug. 27, 1997

[51] Int. Cl.$^6$ ..................................... C08L 83/08
[52] U.S. Cl. ................ 524/838; 106/287.11; 524/837; 528/38; 427/387; 428/447
[58] Field of Search ........... 106/287.11; 524/837, 524/838; 528/38; 427/387; 428/447

[56] References Cited

U.S. PATENT DOCUMENTS

| | | | |
|---|---|---|---|
| 2,683,674 | 7/1954 | Hatcher et al. | 117/123 |
| 3,576,779 | 4/1971 | Holdstock et al. | 106/287.11 |
| 3,772,065 | 11/1973 | Seiler | 117/123 |
| 3,832,203 | 8/1974 | Saunders et al. | 106/287.11 |
| 4,175,159 | 11/1979 | Raleigh | 428/405 |
| 4,228,054 | 10/1980 | Ona et al. | 260/29.2 |
| 4,342,796 | 8/1982 | Brown et al. | 427/136 |
| 4,433,013 | 2/1984 | Puhbringer | 427/337 |
| 4,448,694 | 5/1984 | Plueddemann | 210/682 |
| 4,517,375 | 5/1985 | Schmidt | 556/463 |
| 4,525,213 | 6/1985 | Linn | 106/2 |
| 4,552,910 | 11/1985 | Deubzer et al. | 524/43 |
| 4,584,125 | 4/1986 | Griswold et al. | 252/358 |
| 4,648,904 | 3/1987 | DePasquale et al. | 106/2 |
| 4,877,654 | 10/1989 | Wilson | 427/387 |
| 4,990,377 | 2/1991 | Wilson | 427/387 |
| 5,063,260 | 11/1991 | Chen et al. | 106/287.11 |
| 5,196,054 | 3/1993 | Schmuck et al. | 106/2 |
| 5,244,598 | 9/1993 | Merrifield et al. | 252/314 |
| 5,399,191 | 3/1995 | Mayer et al. | 106/287.11 |
| 5,626,660 | 5/1997 | Lautenschlager et al. | 106/287.11 |
| 5,726,241 | 3/1998 | Maruyama et al. | 524/837 |

*Primary Examiner*—Margaret W. Glass
*Attorney, Agent, or Firm*—Rhodes Coats & Bennett, L.L.P.

[57] ABSTRACT

An aqueous silane composition for increasing the resistance to penetration by aqueous media of an absorbent substrate. The composition includes about 1.7 wt. % of an emulsion of an amino functional silicone having an amine content of about 70 mg KOH/gm; up to about 80 wt. % of a hydrolyzable silane; up to about 5 wt. % of an amino functional silane; and the balance water. The resulting composition is hydrolytically stable for a long period without requiring a separate buffering compound while, at the same time, may be prepared in much higher concentrations to reduce packaging and shipping costs.

10 Claims, No Drawings

4HIGH CONCENTRATION SILANE EMULSIONS FOR RENDERING ABSORBENT SUBSTRATES WATER REPELLENT

BACKGROUND OF THE INVENTION (1) Field of the Invention

The present invention relates generally to aqueous silane compositions and, more particularly, to aqueous silane compositions for use in making absorbent surfaces, such as masonry, water repellent.

(2) Description of the Prior Art

Aqueous silane compositions have become important for making absorbent surfaces, such as masonry, water repellent. The following discussion is generally taken from U.S. Pat. Nos. 4,877,654 and 4,990,377 to Wilson. The entire disclosures of Wilson '654 and '377 are hereby incorporated by reference.

The utility of silanes, especially alkoxysilanes, as masonry water repellents is widely known. Compositions currently in use employ solutions of silanes in various organic solvents such as alcohol, e.g., U.S. Pat. Nos. 3,772, 065, to Seiler and U.S. Pat. No. 4,342,796, to Brown et al. or hydrocarbons, e.g., U.S. Pat. No. 4,525,213 to Linn. Principal limitations of such solvent type compositions include the toxicity and the flammability of the solvents employed.

Aqueous silane compositions which are non-toxic and non-flammable have become important as effective masonry water repellent compositions. See, U.S. Pat. Nos. 4,433,013, to Puhringer, 4,517,375 to Schmidt and 4,648,904 to DePasquale and U.S. Pat. Nos. 4,877,654 and 4,990,377 to Wilson. Such compositions can have an important drawback, however, in that the pH may tend to drift and then the silane reacts with water and hydrolyses. See, e.g., U.S. Pat. Nos. 2,683,674 to Hatcher et al. and U.S. Pat. No. 4,175,159, to Raleigh. This reduces efficacy by reducing the content of active, water-repellent ingredient. Moreover, the pH of the system may shift when additives are included such as a biocide, which is commonly added to retard growth of fungi and the like.

Although the stability of the water-containing emulsions has been enhanced to some extent by refrigerating them, or the problem of reduced efficacy can be avoided by using the emulsions soon after preparation, both expedients are not cost-effective and may in some cases cause waterproofing contractors to go back to the above-mentioned solvent borne, non-aqueous compositions.

In some cases, the pH of the system has been adjusted to increase the rate of resin formation, see e.g., U.S. Pat. Nos. 4,552,910 to Deubzer et al. and U.S. Pat. No. 4,228,054, to Ona et al. Wilson, in U.S. Pat. No. 4,877,654 teaches that by selecting appropriate silanes (largely water insoluble) and appropriate emulsifiers, water-based, normally hydrolyzable silane emulsions may be prepared that are hydrolytically stable if the pH is maintained in a predetermined pH stable range, typically 6–8, with a buffering compound such as sodium bicarbonate. However, Wilson only teaches concentrations of less than about 60 percent and, in fact, his preferred compositions are about 40 percent. Significant savings in packaging and shipping could be obtained if the concentration could be increased since most of the current products are water which could easily be re-added at the site where the composition is being applied.

Thus, there remains a need for a new and improved aqueous silane compositions for use in making absorbent surfaces, such as masonry, water repellent which is hydrolytically stable for a long period without necessarily requiring a separate buffering compound while, at the same time, may be prepared in much higher concentrations to reduce packaging and shipping costs.

SUMMARY OF THE INVENTION

The present invention is directed to an aqueous silane composition for increasing the resistance to penetration by aqueous media of an absorbent substrate. The composition includes about 1.7 wt. % of an emulsion of an amino functional silicone having an amine content of about 70 mg KOH/gm; up to about 80 wt. % of a hydrolyzable silane; up to about 5 wt. % of an amino functional silane; and the balance water.

The amino functional silicone emulsion is pre-mixed including an organic acid such as about 0.4 wt. % of acetic acid (56%); about 20 wt. % of the amino functional silicone; about 7 wt. % of a non-ionic emulsifier; and the balance water.

The emulsified amino functional silicone is than mixed with the silane and water to form a second emulsion using an additional non-ionic emulsifier at about 3.5 wt. %. Also, in the preferred embodiment, the silane is Hexyl Trimethoxy Silane. Because the pre-mixed emulsion is diluted before the second mixing, the amino functional silicone is about 0.35 wt. % of the total weight of the composition.

In one of its embodiments, the present invention also provides a method for increasing the resistance to penetration by aqueous media of an absorbent substrate by applying to the surface of the substrate the composition as above defined and allowing the composition to cure.

Special mention is made of embodiments of this invention comprising compositions and use of such compositions as defined above, wherein they also include an effective amount of a biocide.

Accordingly, one aspect of the present invention is to provide an aqueous silane composition, the composition comprising effective amounts of: (a) an amino functional silicone; (b) a hydrolyzable silane; (c) an amino functional silane; and (d) the balance water.

Another aspect of the present invention is to provide an anti-gelling agent for an aqueous silane composition, the composition comprising effective amounts of: (a) an amino functional silicone having an amine content of about 70 mg KOH/gm; and (b) the balance water.

Still another aspect of the present invention is to provide an aqueous silane composition for increasing the resistance to penetration by aqueous media of an absorbent substrate, the composition comprising effective amounts of: (a) an amino functional silicone having an amine content of about 70 mg KOM/gm; (b) a hydrolyzable silane; (c) an amino functional silane; (d) at least one emulsifier; and (e) the balance water.

These and other aspects of the present invention will become apparent to those skilled in the art after a reading of the following description of the preferred embodiments.

DESCRIPTION OF THE PREFERRED EMBODIMENTS

The present invention is particularly suited to a method for increasing the resistance to penetration by aqueous media of an absorbent substrate, such as masonry, to prevent or reduce seeping into residential basements.

By the term "masonry" used herein, is meant any absorbent inorganic substrate, particularly building compositions and including but not limited to structural ceramics such as common brick, paving brick, face brick, sewer pipe, drain tile, hollow block, terra cotta, conduits, roofing tile, flue lining, cements such as Portland cement, calcined gypsum products, i.e., molding and building plaster and stucco, magnesia cement, insulation products such as electrical and thermal insulators (diatomaceous earth brick) and porcelain spark plugs, etc.

The masonry materials also include stone, tile, artificial stone, adobe, concrete and reinforced concrete such as found in roadways, bridge decks, airport runways, parking garage decks, and other concrete building structures.

The masonry materials which can be treated in accordance herewith are preferably dry when treated with the water repellent compositions, although they may be wet. In the case of settable masonry materials, the compositions of the present invention may be incorporated in the preset mixture, for example, into a concrete mix prior to casting and setting. Wood, structural timbers, siding and the like can also be made water repellent using this invention.

The water-based compositions of the present invention preferably include a hydrolyzable silane, for example, one with a molecular weight up to about 600 (or essentially a multiple thereof, if oligomerized) and the general formula of $R_n$—Si—$(R^1)_{4-n}$, wherein R is a $C_1$–$C_{30}$ hydrocarbyl or halogenated hydrocarbyl group, $R^1$ is a $C_1$–$C_6$ alkoxy, halide, amino, carboxyl, or a mixture of any of the foregoing, and n is 1 or 2. The hydrocarbyl group comprises hydrogen and carbon atoms and may be aliphatic, or cycloaliphatic, or aryl, or aralkyl. These hydrocarbyl radicals may also contain as substituent groups, halogen, e.g., chlorine, bromine, fluorine; nitrogen; oxygen or sulfur heteroatoms. One or more of such halogen substituents may be present in the R group. The $R^1$ group can comprise $C_1$–$C_6$ alkoxy, halogen, amino, or carboxylate group. Thus, among the alkyl groups useful as $R^1$ are methyl, ethyl, n-propyl, isobutyl and isopropyl. As indicated, n may be 1 or 2 and thus, monohydrocarbyl substituted alkoxysilanes and dihydrocarbyl substituted alkoxysilanes are contemplated by the present invention. The active ingredients of the invention can also comprise condensation dimers and trimers, or other oligomers of the silanes, as are well known in the art. The hydrolyzable silanes can range widely in amount. However, typically the amount can comprise from about 1 to about 80 percent by weight of the composition, and especially from about 60 to about 80 percent by weight.

Silanes especially useful in accordance with the present invention generally have a molecular weight in excess of 135 and preferably greater than 190 up to about 600 for the monomers. The dimers and trimers present in the composition will, of course, have essentially multiples of the molecular weights of the single specie of silane or silanes being used. It should be noted that mixtures of various silanes may be used, if desired.

Specific examples of silanes useful in accordance with the present invention include, but are not limited to, methyltrimethoxysilane, methyltriethoxysilane, methyltri-n-propoxysilane, ethyltrimethoxysilane, ethyltriethoxysilane, dimethyldimethoxysilane, dimethyldiethoxysilane, ethyltri-n-propoxysilane, propyltriethoxysilane, propyltri-n-propoxysilane, butyltrimethoxysilane, butyltriethoxysilane, dibutyldimethoxysilane, isobutyltrimethoxysilane, di-isobutyldimethoxysilane, isobutyltriethoxysilane, n-hexyltrimethoxysilane, 6-chloro-hexyltrimethoxysilane, 6,6,6-trifluro hexyltrimethoxysilane, cyclohexyltrimethoxysilane, benzyltrimethoxysilane, 4-chlorobenzyltriethoxysilane, 4-bromobenzyltri-npropoxysilane, phenyltrimethoxysilane, phenyltriethoxysilane, octyltrimethoxysilane, octyltriethoxysilane, octyltriisopropoxysilane, 2-ethylhexyltrimethoxysilane, 4-chlorobenzyltrimethoxysilane, decyltrimethoxysilane, dodecyltrimethoxysilane, dodecyltribromosilane, tetradecyltriethoxysilane, hexadecyltriethoxysilane, octadecyltriethoxysilane, eicosyltrimethoxysilane, and the like, mixtures of any of them and the like, alone, and in admixture with dimers, trimers and other oligomers thereof.

A wide variety of emulsifiers have been tried or are expected to be useful in the present invention. Nonionic, anionic, cationic and amphoteric emulsifiers are well known from the state of the art. The preferred emulsifiers are, however, nonionic. The concentration of emulsifier or emulsifiers used in accordance with the present invention may range widely, but preferably is about 3.5 wt. % of the total weight of the composition.

In general, those emulsifiers or emulsifier blends which have an HLB in the range from about 1.5 to about 20, and preferably in the range from about 4 to about 17 may be used herein. The proper HLB value for a given silane or silane mixture may be determined experimentally in order to ascertain the optimum stability.

The HLB classification of surfactants is based on molecular structure and therefore can be used to predict the behavior of single molecules. HLB is determined experimentally by techniques known to those skilled in this art, for example, those set forth in the pamphlet "The HLB System" published by ICI Americas, Inc., Wilmington, Del., U.S.A. See also the publication "Adjuvants for Herbicides", Weed Society of America, Champaign, Ill., U.S.A. If the HLB of an emulsifier is below 1.5, it is expected that it will not be useful in this invention because it will not produce a stable oil-in-water emulsion. If, on the other hand, the HLB is above 20, it also is expected not be useful because stability is poor. HLB values in the range of 4–17 are preferred because they provide the most stable emulsions of the above mentioned silanes.

Specific examples of emulsifying agents which may be used in accordance herewith include, but are not limited to the following with the HLB value given in parenthesis following the name: sorbitan trioleate (1.8), sorbitan tristearate (2.1), polyoxyethylene sorbitol hexastearate (2.6), glycerol monostearate (3.8), sorbitan monooleate (4.3), sorbitan monostearate (4.7), polyoxyethylene(2 mole) stearyl ether (4.9), sorbitan monopalmitate (6.7), polyoxypropylene mannitol dioleate (8), polyoxyethylene sorbitol oleate (9.2), polyoxyethylene stearate (9.6), polyoxyethylene sorbitan monooleate (10.0), polyoxyethylene monooleate (11.4), polyoxyethylene(6 mole) tridecyl ether (11.4), polyoxyethylene(10 mole) cetyl ether (12.9), polyoxyethylene sorbitan monooleate (15), polyoxyethylene(20 mole) stearyl ether (15.3), polyoxyethylene(15 mole) tridecyl ether (15.4), polyoxyethylene alkylamine (cationic, 15.5); polyoxyethylene alcohols having an HLB of 9.7, about 10, and 11.6; ethoxylated nonylphenols having HLB values of 10, 11 and 12; dialkylphenol ethoxylates having an HLB value of 10.6; block copolymers of ethylene oxide and propylene oxide having HLB values in the range of 5.5 to 15; ethoxylated octyl phenols having an HLB of about 13.5, 17.3, and 17.9; fatty acid glycerides having an HLB value of approximately 4, sodium lauryl sulfate, sodium oleate, mixtures of any of the foregoing, and the like.

The preferred emulsifying agents, given in the table below, are expected to provide especially useful emulsions of silanes.

TABLE I

| TYPE OF SURFACTANT | EXAMPLES (SUPPLIER; HLB) |
|---|---|
| Polyoxyethylene alcohols | Brij 30 (ICI Americas; 9.7) Tertigol 15-S-3 (Union Carbide; approx. 10) Triton DF 16 (Rohm & Haas; 11.6) |
| Ethoxylated nonyl phenols | NP-6 (Union Carbide; 11) NP-7-(Union Carbide; 12) CO-520 (GAF; 10) |
| Dialkyl phenol ethoxylate | DM-530 (GAF; 10.6) |
| Block copolymers of ethylene oxide and propylene oxide | Pluronics (BASF) L42 (8), L62 (7), L64 (15) L72 (6.5), L92 (5.5), 25R2 (6.3) Tetronic 702 (BASF; 7) |
| Fatty acid glycerides | Arlacel 165 (ICI Americas; 4) |
| Sorbitan fatty acid esters | Spans (ICI Americas) 20 (8.6), 40 (6.7), 60 (4.7) 80 (4.3) |
| Polyoxyethylene sorbitan fatty acid esters | Tween 61 (ICI Americas; 9.6) Tween 81 (ICI Americas; 10.0) Atlas G-1096 |
| Blends of sorbitan esters with polyoxyethylene amines | Atlas G-2090 (ICI Americas) |
| Amphoteric | Atlas G-271 (ICI Americas) |
| Polyvinyl alcohol | (Air Products and Chemicals, Inc.) |
| Blend of octylphenol polyoxyethylene ethanol | Triton X-100 and Triton X-305 (Rohm & Haas, about 15) |

Blending may be necessary, and desirable, if one of the emulsifiers, e.g., sodium lauryl sulfate, has an HLB outside the range of 1.5–20. Sodium lauryl sulfate, HLB about 40, will be blended with a low HLB material, as illustrated above, for use.

Two methods are convenient for measuring long term stability: one is to determine final pH and final silane content, after aging, and the other is to performance test the silane emulsions on mortar cubes using standard test methods, such as those described in the above-mentioned DePasquale and Wilson patents. In the former, using an unsuitable buffering compound will not prevent the pH from swinging into a range promoting hydrolysis, e.g., from 7.5 to 4.0 and the final silane concentration will be materially reduced, e.g., cut from 40 percent to 20 percent and, in extreme cases, all the way down to zero percent. Such a test is usually carried out over a significant time period, e.g., after aging the emulsion under test for up to 12 months at room temperature.

In the performance test, a 2 inch mortar cube is coated in duplicate with the test emulsion and the coating cured, then immersed in water for 21 days. The percent reduction in weight gain of compound treated cubes compared to untreated control cubes is indicative of the retention of silane content and the efficacy of the buffering agent.

In experiments reported by Wilson '654, emulsions were unbuffered and prepared in accordance with prior art procedures. They contained biocide which decomposed to acetic acid and lowered the pH to 4. Within a month of manufacture, such emulsions showed decreased performance in the water repellency test set forth above. They also showed reduced silane concentration, as determined by gas chromatography. After 5 months, Wilson reported that the state of the art emulsion performed very poorly in water repellency tests on concrete.

In response to these observations, Wilson made numerous experiments which demonstrated that various buffers were effective in raising the pH of the state of the art emulsion to about 7.5, and maintaining the effectiveness of the formulation over a period of time.

Specifically, Wilson reported emulsions of predominantly n-octyltriethoxysilane, PCR, Inc.'s PROSIL® 9202 organofunctional silane, buffered in this manner, were analyzed by gas chromatography after one year, over 95 percent of the silane remained unhydrolyzed. Moreover, unbuffered emulsions at pH 4 showed less than 5% unhydrolyzed silane after a similar period, indicating the long term stabilizing effect of the buffering compound. Thus, it is surprising that the present invention does not require a buffering agent to perform satisfactorily.

If a biocidal agent is used, any of those well known in the art for imparting antimicrobial and biocidal activity can be used in conventional amounts, e.g., from about 0.1 to about 5 percent by weight based on the composition. Suitable biocidal agents for these embodiments comprise 6-acetoxy-2,4-dimethyl-m-dioxane, sold by Givaudan Corp. under the trademark Giv-Gard DXN biocide, methyl p-methoxy benzoate, and the like. Typical concentrations of these biocides are 0.15 percent by weight.

In addition to biocides, the present invention may include other additives such as fragrances, colorants, thickeners, foaming agents, anti-foaming agents, and the like.

The present invention can best be understood after a review of the following example.

EXAMPLE

First, a micro emulsion of an amino functional silicone with an amine content of about 70 mg KOH/gm was prepared using 20.0 parts of the amino functional silicone; 7.0 parts of a non-ionic emulsifier; 0.4 parts of acetic acid (56%); and 72.6 parts of deionized water. A kettle is charged with the silicone and emulsifier and mixed at high speed. About 80 percent of the water is added over a period of about 3 hours. The acetic acid is than added and the balance of the water is slowly added.

Second, a water-proofing composition according to the present invention was prepared using 1.7 parts of the above-emulsion; 3.5 parts of a non-ionic emulsifier; 75 parts of hexyl trimethoxy silane; 4.1 parts of amino propyl tri ethoxy silane; and 15.7 parts deionized water. The kettle is changed with the water and the emulsifier and mixed at high speed. About 80 percent of the silane is added over a period of about 3 hours. The micro emulsion and the balance of the silane is than added.

The batch is then slowly heated to about 100° F. and homogenized through a homogenizer at about 1000 lbs. in the second stage; about 2000 lbs. in the first stage; and a total pressure of about 3000 lbs. The final composition is discharged and forced cool to room temperature.

The above composition was tested for stability, density and water repellency on masonry. Not only was the composition prepared according to the present invention hydrolytically stable without requiring a separate buffering compound, it could be prepared at a much higher concentration than the prior art, thereby reducing packaging and shipping costs.

For performance testing, emulsions prepared as described above were tested using concrete cubes in accordance with DePasquale and Wilson, U.S. Pat. No. 4,648,904. Cement mortar cubes two inches on the side are conditioned in a control room at 73 degree(s) F. and 50 percent relative humidity for 21 days to give a constant weight. Each composition to be tested for water repellency is applied to two cubes at the rate of 125 square feet per gallon (3.07 square meters per liter), and the coated cubes are cured on a rack in a control room for 13 days prior to recording the initial weight of each cube. All of the cubes including two untreated control cubes are placed on a rack and immersed in a distilled water bath. After 21 days of immersion the cubes are removed, blotted dry and immediately weighed. The percent weight gain or reduction of each block is then calculated. A Higher Reduction of Weight Gain indicates higher effectiveness as an absorbent material water repellent. Due to the variability of the mortar blocks, values for percent Reduction of Weight Gain have a precision of about plus or minus 5 percent.

Certain modifications and improvements will occur to those skilled in the art upon a reading of the foregoing description. For example, the silane can comprise isobutyltrimethoxysilane, octadecyltriethoxysilane, 4R-triethoxysilylmenthene-1, mixtures thereof, and the like. Instead of 80 percent by weight, the composition can comprise as low as 50 percent by weight of silane. In addition, while the preferred amino functional silane is Amino Propyl Tri Ethoxy Silane, it is expected that other amino functional silanes could also work. Also, the biocide can be omitted. It should be understood that all such modifications and improvements have been deleted herein for the sake of conciseness and readability but are properly within the scope of the following claims.

We claim:

1. An aqueous silane composition for increasing the resistance to penetration by aqueous media of an absorbent substrate, said composition comprising effective amounts of:

(a) an amino functional silicone having an amine content of about 70 mg KOH/gm;
   (b) greater than about 50 wt. % of a hydrolyzable silane;
   (c) an amino functional silane; and
   (d) the balance water.

2. The composition according to claim 1, further including at least one non-ionic emulsifier.

3. The composition according to claim 2, wherein said emulsifier is about 4 wt. % of the total weight of said composition.

4. The composition according to claim 1, wherein said hydrolyzable silane is hexyl trimethoxy silane and said amino functional silane is amino propyl tri ethoxy silane.

5. The composition according to claim 4, wherein said hydrolyzable silane is up to about 80 wt. % of the total weight of said composition.

6. The composition according to claim 1, wherein said amino functional silicone is about 3.5 wt. % of the total weight of said composition.

7. The composition according to claim 1, further including an organic acid.

8. The composition according to claim 4, wherein said organic acid is acetic acid (56% by weight in water).

9. The composition according to claim 7, wherein said organic acid is about 0.01 wt. % of the total weight of said composition.

10. A method for increasing the resistance to penetration by aqueous media of an absorbent substrate, said method comprising the steps of:

(a) applying to the surface of said substrate an aqueous silane composition comprising effective amounts of: (i) an amino functional silicone having an amine content of about 70 mg KOH/gm; (ii) greater than about 50 wt. % of a hydrolyzable silane; (iii) an amino functional silane; and (iv) the balance water; and
   (b) allowing said composition to cure.

\* \* \* \* \*